(No Model.)
J. A. ELLISON.
CUTTER FOR CARD SETTING MACHINES.
No. 439,057. Patented Oct. 21, 1890.
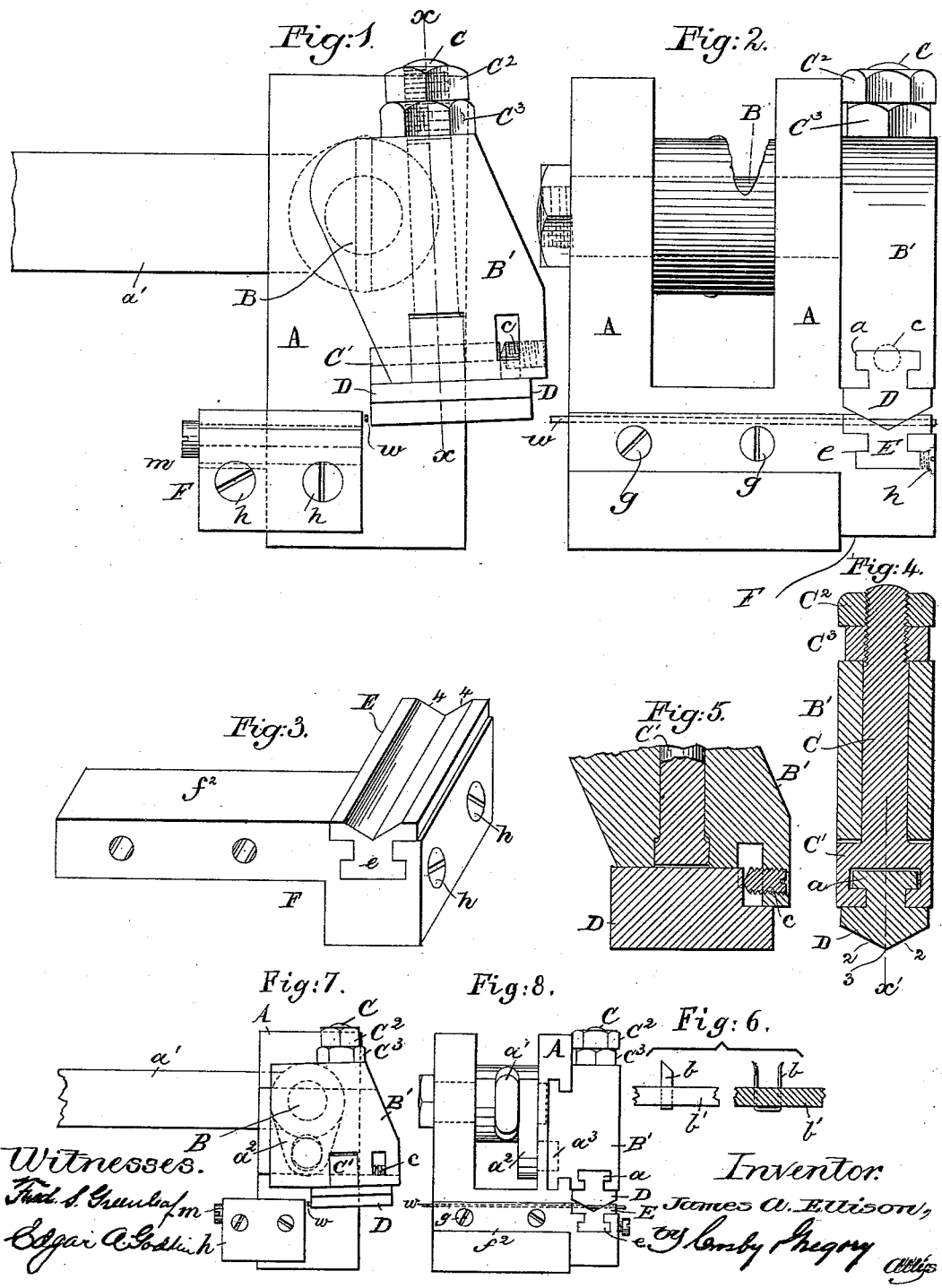

UNITED STATES PATENT OFFICE.

JAMES A. ELLISON, OF NORTH ANDOVER, MASSACHUSETTS, ASSIGNOR TO THE DAVIS & FURBER MACHINE COMPANY, OF SAME PLACE.

CUTTER FOR CARD-SETTING MACHINES.

SPECIFICATION forming part of Letters Patent No. 439,057, dated October 21, 1890.

Application filed July 31, 1890. Serial No. 360,519. (No model.)

*To all whom it may concern:*

Be it known that I, JAMES A. ELLISON, of North Andover, county of Essex, State of Massachusetts, have invented an Improvement in Cutters for Card-Setting Machines, of which the following description, in connection with the accompanying drawings, is a specification, like letters on the drawings representing like parts.

This invention has for its object the production of a novel machine for cutting wire into short lengths for card-teeth or clothing and the like.

My invention relates, chiefly, to the dies used and to the means for holding the same, as will be hereinafter described.

Figure 1 is a side elevation of a sufficient portion of a cutter embodying my invention to enable the same to be understood; Fig. 2, a front end elevation thereof. Fig. 3 shows the lower die and holder detached; Fig. 4, a section in the dotted line $x\,x$, Fig. 1; Fig. 5, a partial section in the line $x'$, Fig. 4. Fig. 6 shows two pieces of card-clothing each with a tooth cut, as may be done by the cutter to be herein described, by employing dies of proper shape; Figs. 7 and 8, side and front elevations of a modification to be hereinafter referred to.

The frame A of the machine has bearings for a suitable rock-shaft B, provided with a cutter-carrying arm B′, located eccentrically to said shaft, as best shown in Fig. 1, wherein said shaft is shown by dotted lines.

The cutter-carrying arm receives the threaded shank C of the cutter-holder C′, which is held in place by suitable nuts $C^2$ $C^3$, to thereby support the cutter. The cutter-holder C′ is represented as provided at its under side with a dovetail groove, in which is entered a dovetail projection $a$ of the cutter D, shaped as shown in cross-section, the angle of the surfaces 2 2 thereof, which form the cutting-edges, being more or less inclined from the apex 3, according to the acuteness desired for the bevel of the points of the teeth $b$, which are to be set in the card-clothing $b'$.

The cutter D is backed up by a screw $c$. (Shown in Figs. 1 and 5.) This cutter D, supported or carried by the cutter-carrying arm B′, constitutes the movable member of the cutting-off device.

The second member E of the cutting-off device consists of a block grooved longitudinally to leave beveled or inclined corners or edges 4 4, which in co-operation with the edges 2 2 of the movable member having edges of like inclination constitute the cutting-edges to sever the flattened or other wire $w$ at two points and form opposite bevels, as required, and give to the ends of the wire the proper bevels.

The member or cutter E has a shank $e$, which is held firmly in the cutter-carrying block F by means of screws $h\,h$, said block having a shank $f^2$, which is attached to the frame-work by suitable screws $g$. The cutter E is backed up by a screw $m$. As the cutters are worn away by grinding, they may be kept in adjusted position by the backing-screws.

The wire $w$ may be fed to the dies by any usual wire-feeding mechanism, and the wire may be of any usual shape in cross-section.

The cutters D and E may be readily removed and cutters of any other bevel be substituted for them, according to the angle to be given to the ends of each tooth.

The cutter-carrier B′ (best shown in Fig. 1 of the drawings) is so shaped and connected to the shaft B as to enable the cutter D to be connected to a vibrating head and yet come into cutting position and co-operate with cutter E, substantially in the vertical line of the center of oscillation of the shaft B and make a clean cut through the wire, the cutters thereby removing a V-shaped piece to simultaneously bevel point the ends of two teeth, and this with the minimum waste of stock.

I do not claim, broadly, a card-tooth cutter, as prior to my invention disk-like cutters have been used.

A lever or arm $a'$ is attached to the shaft B, by which it may be given a rotary reciprocating motion to reciprocate the cutter-carrier B′.

Referring to Figs. 7 and 8, the cutter-carrying arm B′ is provided with a dovetailed shank, which slides in a correspondingly-shaped groove formed in the frame A, and a crank-arm $a^2$, mounted on a rod or shaft B, has a pin $a^3$, which engages and moves said carrier B' back and forth as the shaft is reciprocated by the arm or lever $a'$. Thus it will be seen that the cutter-carrying arm B' may be reciprocated in different ways.

The position of the cutter D E may be reversed, if desired.

I claim—

1. In a card-tooth-pointing cutter, the rock-shaft, the cutter-carrying arm B', eccentrically connected with said rock-shaft and oscillated by it, the cutter-holder secured to the said arm, and the cutter clamped to the arm by said cutter-holder, combined with the cutter E and means for holding it, substantially as described.

2. In a card-tooth-pointing cutter, the rock-shaft, the cutter-carrying arm B', eccentrically connected with said rock-shaft and receiving an oscillating motion from it, the cutter-holder adjustably secured to the cutter-carrying arm, and the cutter D, secured to said arm by the cutter-holder and having the beveled cutting-edges 2 2, combined with the cutter E, having beveled cutting-edges 4 4, and means to hold it, the said cutters being shaped, as stated, to remove a V-shaped piece of material from the wire to point the teeth, substantially as described.

In testimony whereof I have signed my name to this specification in the presence of two subscribing witnesses.

JAMES A. ELLISON.

Witnesses:
 FRANK D. FOSTER,
 MOSES MERRILL.